(12) United States Patent
Klieber

(10) Patent No.: US 6,394,694 B1
(45) Date of Patent: May 28, 2002

(54) CONNECTION CLAMP, IN PARTICULAR FOR HANDLEBAR AND FRONT MOUNTING UNITS OF BICYCLES AND THE LIKE

(75) Inventor: Jochen Klieber, Tacherting (DE)

(73) Assignee: Jo Klieber GmbH (DE)

( * ) Notice: Subject to any disclaimer, the term of this patent is extended or adjusted under 35 U.S.C. 154(b) by 0 days.

(21) Appl. No.: 09/616,906

(22) Filed: Jul. 14, 2000

(51) Int. Cl.[7] .................................................. F16B 7/02
(52) U.S. Cl. ........................ 403/391; 403/389; 74/551.1
(58) Field of Search ................................ 403/396, 389, 403/391, 385, 384; 280/279; 74/551.1–551.8

(56) References Cited

U.S. PATENT DOCUMENTS

| | | | | |
|---|---|---|---|---|
| 556,398 A | * | 3/1896 | Blood et al. ................ 74/551.4 |
| 2,469,542 A | * | 5/1949 | Becker ..................... 403/391 X |
| 3,248,684 A | * | 4/1966 | Hubbard et al. ......... 403/391 X |
| 4,273,465 A | * | 6/1981 | Schoen ........................ 403/391 |
| 5,570,614 A | * | 11/1996 | Nastrucci ................... 74/551.1 |
| 5,755,141 A | * | 5/1998 | Chen .......................... 74/551.3 |
| 5,769,556 A | * | 6/1998 | Colley ..................... 403/396 X |
| 5,921,145 A | * | 7/1999 | Muser ........................ 74/551.2 |

FOREIGN PATENT DOCUMENTS

FR  638790  * 6/1928 ................ 74/551.1

* cited by examiner

Primary Examiner—Lynne H. Browne
Assistant Examiner—John R. Cottingham
(74) Attorney, Agent, or Firm—Ronald E. Greigg

(57) ABSTRACT

A connection clamp is disclosed, in particular for handlebar and front mounting units of bicycles and the like, which has features including two separate clamping points for the handlebar and the front mounting; only one clamping screw for both clamping points; at least one clamping screw is provided which is adjustable in at least two positions, at least one opening position and at least one clamping position; raised portions are provided on both sides of the bore of the handlebar receptacle; recesses are provided both in the region of the screw bore and in the region between the bores for receiving the handlebar and the front mounting; slots are provided between respective first and second portions of each of the clamping points, and the widths of these slots in an opening position is greater than the widths of these slots in a clamping position.

8 Claims, 2 Drawing Sheets

Figure 1:
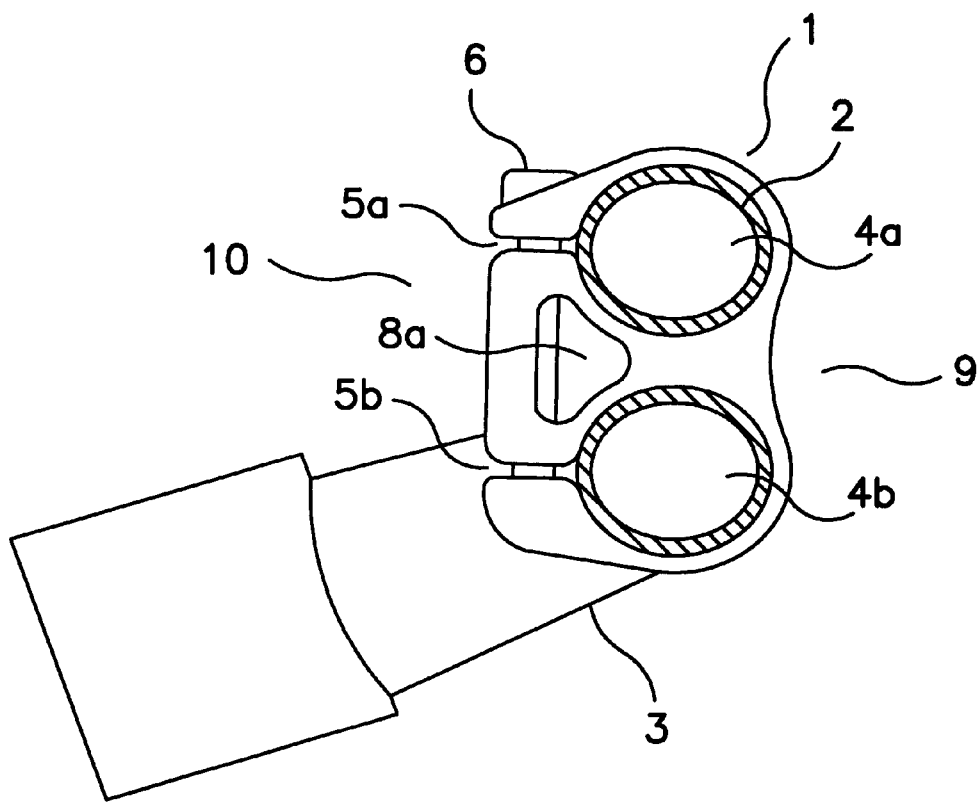

CONNECTION CLAMP, IN PARTICULAR FOR HANDLEBAR AND FRONT MOUNTING UNITS OF BICYCLES AND THE LIKE

The present invention relates to a connection clamp that is especially suited for use for handlebar and front mounting units of bicycles. The use of handlebar and front mounting units in bicycles is not the sole possible use, however; connection clamps of the type described here can also be used for instance on vehicles and equipment that have a handlebar or the like for changing direction. For the sake of simplification, the invention will be described below with reference to its use in handlebar and front mounting units of bicycles, but this description should not in any way be understood to restrict its use.

Depending on the type of bicycle and on the field of use of the bicycle, the handlebar can take different forms, but its cross section is usually cylindrical. The handlebar of a bicycle is usually fastened directly onto the front mounting. The fastening is done via a screw clamp. To enable adjusting the length and/or height of the handlebar, the handlebar can be connected to the front mounting by means of connection clamps. Typically two connection clamps, one on the left and one on the right of the front mounting, connect the front mounting to the handlebar. This is then called a handlebar and front mounting unit. Typically, the handlebars, connection clamps and front mountings are manufactured from metal, lightweight metal, or fiber-reinforced plastic.

In the prior art, connection clamps have become known that each have one clamping point on the handlebar and one clamping point on the front mounting. The clamping points are each provided with a clamping slot and a clamping screw.

Also known in the prior art are connection clamps that have only one common clamping point, one common clamping slot, and one common central clamping screw.

A disadvantage of the connection clamps with two clamping points that are known in the prior art is that adjusting the height and/or length of the handlebar is then possible only if all the clamping screws of the clamping points are loosened and then tightened again. This means that it is inconvenient and time-consuming to adjust the height and/or length of the handlebar. Furthermore, connection clamps with two clamping points and two clamping screws are necessarily heavier, because of their design, than connection clamps with only one common clamping point.

A disadvantage of the connection clamps, known in the prior art, that have one common clamping point, one common clamping slot, and one common central clamping screw is that jointly clamping the handlebar, connection clamp and front mounting is possible only if the various clamping points have no tolerances. Experiments have demonstrated that even if there are only minimal tolerances between the handlebar, the connection clamp or the front mounting, it is no longer possible to clamp them securely and without relative rotation.

It is therefore the object of the present invention to make a connection clamp available that meets the demands described above and that in particular assures reliable function while being easy to adjust.

This object is attained according to the invention by the subject of claim 1.

The present invention has made a connection clamp available that has high functional reliability and makes easy adjustment possible.

A connection clamp of the invention has one bore for clamping the handlebar and one bore for clamping the front mounting. Each of the two bores has its own clamping slot. The two clamping slots are substantially parallel to one another, and the clamping slots penetrate the bores toward their center axis.

The two clamping slots are actuated with only a single clamping screw. The clamping screw is located parallel to the clamping bores.

The two clamping slots can be positioned in at least a first opening position and in a second clamping position. The width of the two clamping slots in the opening position is greater than the slot width in the clamping position.

The connection clamp of the invention has many advantages.

One particular advantage of the connection clamp is that the two clamping bores with only a single clamping screw clamp completely independently of one another, and that the clamping screw is located outside the path of force.

In experiments it has been shown that even at relatively great tolerances between the handlebar, connection clamps and/or front mounting, the two clamping slots of the clamping bores already decrease in size at only a slight tightening moment of the clamping screws, such that reliable clamping is attained. Because only one clamping screw is used, the installation time can be shortened and the weight reduced in the connection clamp of the invention.

Another advantage of the connection clamp of the invention is enhanced safety in use, since because only one clamping screw is used, there is less risk that a clamping screw might fail to be tightened. Yet the advantages of the connection clamp having two clamping screws, that is, completely independent clamping points, are preserved.

In a preferred refinement of the invention, the fastener is a screw device with a screw as the tensioning element, and the screw preferably has a screw head with a hexagonal socket. However, it is also possible for the fastener to be provided with a fast-tightening device, for instance via an element of the kind used in so-called fast-action hubs in the bicycle field.

In a further preferred refinement of the present invention, an extension is provided on at least one side of the clamping bore of the handlebar. The connection clamp can be mounted with the extension pointing outward or inward.

If mounted pointing outward, this extension reduces the notch tension between the handlebar and the connection clamp. If pointing inward, this extension has a stiffening effect on the handlebar.

The extension can also be embodied outward and inward, and then both advantages are jointly effective.

In a further preferred refinement of the invention, the connection clamp substantially comprises a solid material and is at least in part of a metal or plastic. To reduce weight, lightweight metal, and especially preferably aluminum, or an aluminum or titanium alloy, is preferably used. As the material, a fiber-reinforced plastic can also be used, for example.

In a further preferred refinement of all the versions described thus far, recesses are made from the side of the clamping screw, in order to reduce the weight. These locations are especially suitable, since experiments have shown that no force transmission occurs there, and these recesses have no influence whatever on the service life and durability of the connection clamps.

Further advantages, characteristics and exemplary embodiments of the present invention will become apparent from the ensuing description in conjunction with the drawings in FIGS. 1–5.

Figure 2:
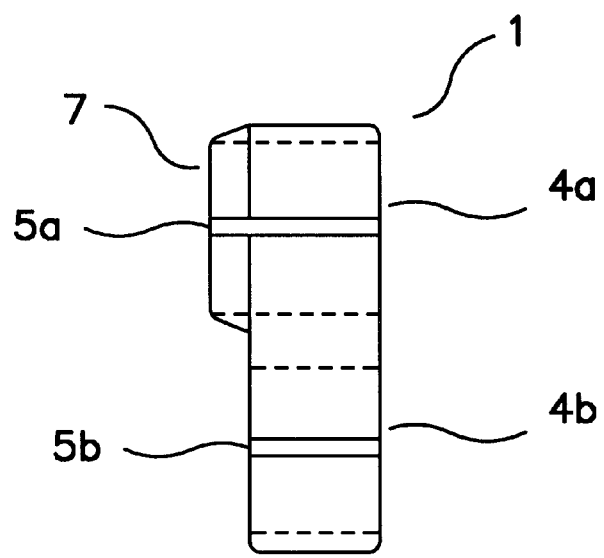
Figure 3:
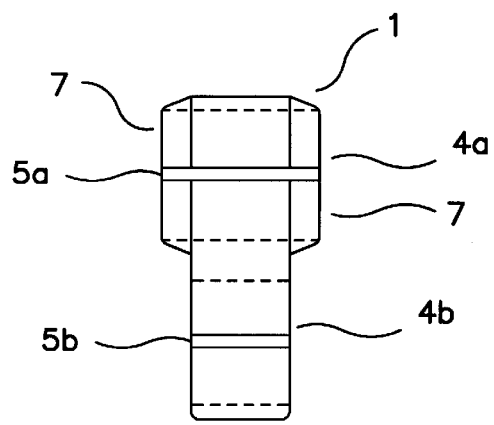
Figure 4:
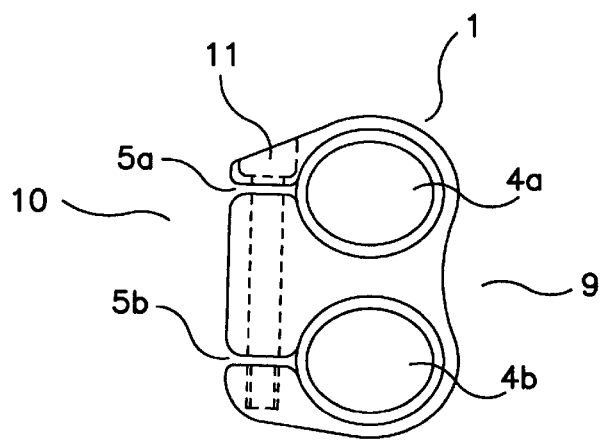
Figure 5:
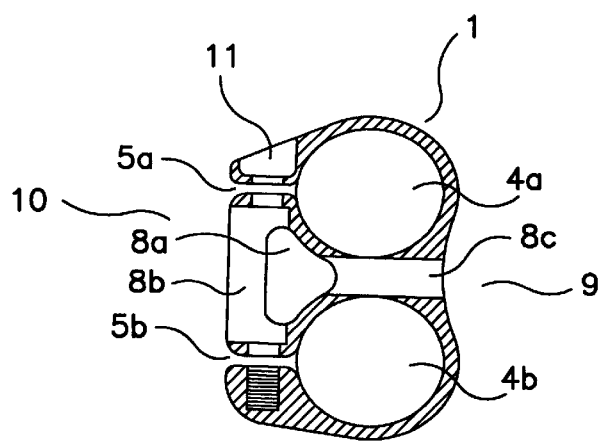

Shown are:

FIG. 1, a side view of a first exemplary embodiment in the installed state;

FIG. 2, a longitudinal view of a second exemplary embodiment of the connection clamp of the invention;

FIG. 3, a longitudinal view of a third exemplary embodiment of the connection clamp of the invention;

FIG. 4, a side view of the present invention;

FIG. 5, a side view in section of a further exemplary embodiment of the connection clamp of the invention.

Exemplary embodiments of the invention will now be described, in conjunction with the application drawing figure.

In FIG. 1, the connection clamp 1 is shown in the installed state as a handlebar and front mounting unit.

In FIG. 2, a view of the connection clamp 1 from the front is shown. The connection clamp has a raised portion 7 on one side of the bore 4a for receiving the handlebar.

In FIG. 3, a further exemplary embodiment of the connection clamp 1 is shown. The connection clamp 1 has a raised portion on both sides of the bore 4a for receiving the handlebar.

In FIG. 4, a side view of the connection clamp 1 is shown. The clamping screw 6 is located in the rear region 10.

In FIG. 5, a further exemplary embodiment is shown, in a modification of the exemplary embodiment described above. The rear region 10 and the front region 9, in the exemplary embodiment shown here, have the bores 4a and 4b for reducing weight.

What is claimed is:

1. A connecting clamp, in particular for a handlebar and a front mounting unit of a bicycle, the clamp comprising, a one-piece clamp body a pair of spaced parallel clamp openings extending through said clamp body for receiving and clamping a handlebar and a front mounting unit, respectively, slot means formed in said clamp body extending from an external surface thereof into each of said clamp openings, said slot means having a predetermined width in the unclamped position a fastener opening formed in said clamp body and extending through said slot means in generally perpendicular relation thereto, and a single elongated fastener extending through said fastener opening and operable to clamp a handlebar and a front mounting unit in said clamp openings by reducing the width of said slot means.

2. The connecting clamp defined in claim 1 wherein said slot means comprises a pair of generally parallel slots extending one into each of said clamp openings, and wherein each said slot has a pair of spaced opposed faces, said fastener means extending through and being operable to reduce the spacing between each said pair of opposed faces.

3. The connecting clamp defined in claim 1 wherein said clamp body is formed form a lightweight metal.

4. The connecting clamp defined in claim 1 wherein said fastener mean comprises an elongated threaded fastener.

5. The connecting clamp defined in claim 4 wherein said threaded fastener is a hex-headed bolt.

6. The connecting clamp defined in claim 1 further comprising at least one raised portion on said clamp body surrounding and providing an axial extension of the handlebar opening in said clamp body.

7. The connecting clamp defined in claim 6 wherein raised portions are provided on said clamp body at each end of the handlebar opening.

8. In a bicycle including a handlebar, a first mounting unit, and a connecting clamp for mounting the handlebar on the front mount unit, the improvement wherein said connecting clamp comprising, a one-piece clamp body a pair of spaced parallel clamp openings extending through said clamp body for receiving and clamping said handlebar and said front mounting unit, respectively, a pair of generally parallel slots formed in said clamp body extending from an external surface thereof one into each of said clamp openings, each said slot defining a pair of spaced, opposed faces a fastener opening formed in said clamp body and extending through said slots in generally perpendicular relation thereto, and a single elongated fastener extending through said fastener opening and operable to clamp said handlebar and said mounting unit in said clamp openings by reducing the space between the opposed faces of said slots.

\* \* \* \* \*